May 10, 1932.  E. WALDER  1,857,417
THERMOSTATICALLY CONTROLLED ELECTRIC CIRCUIT
Filed Oct. 27, 1926  2 Sheets-Sheet 2
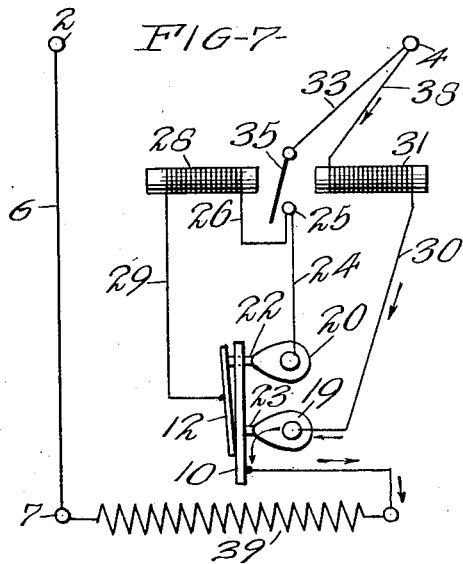
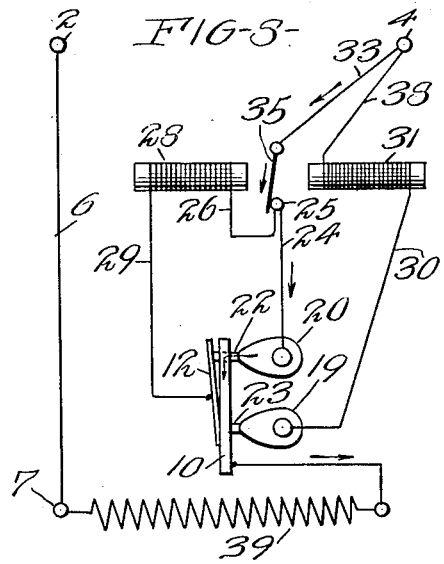
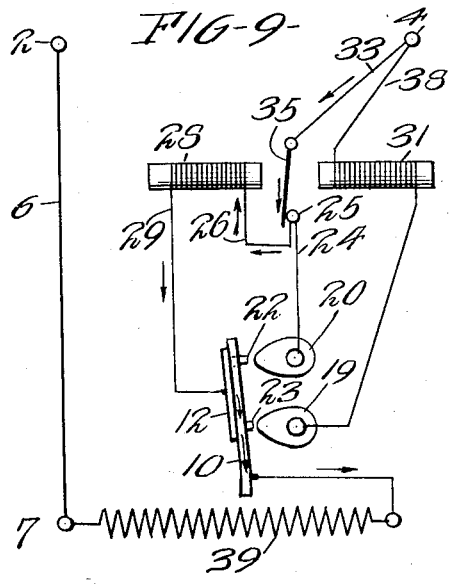
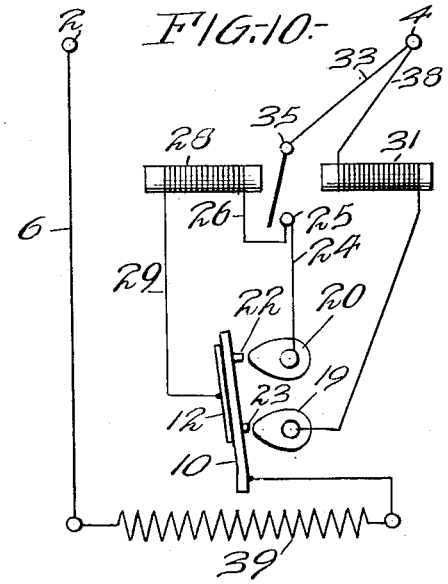
Inventor
Emil Walder
By Herbert S. Fairbanks
Attorney Patented May 10, 1932

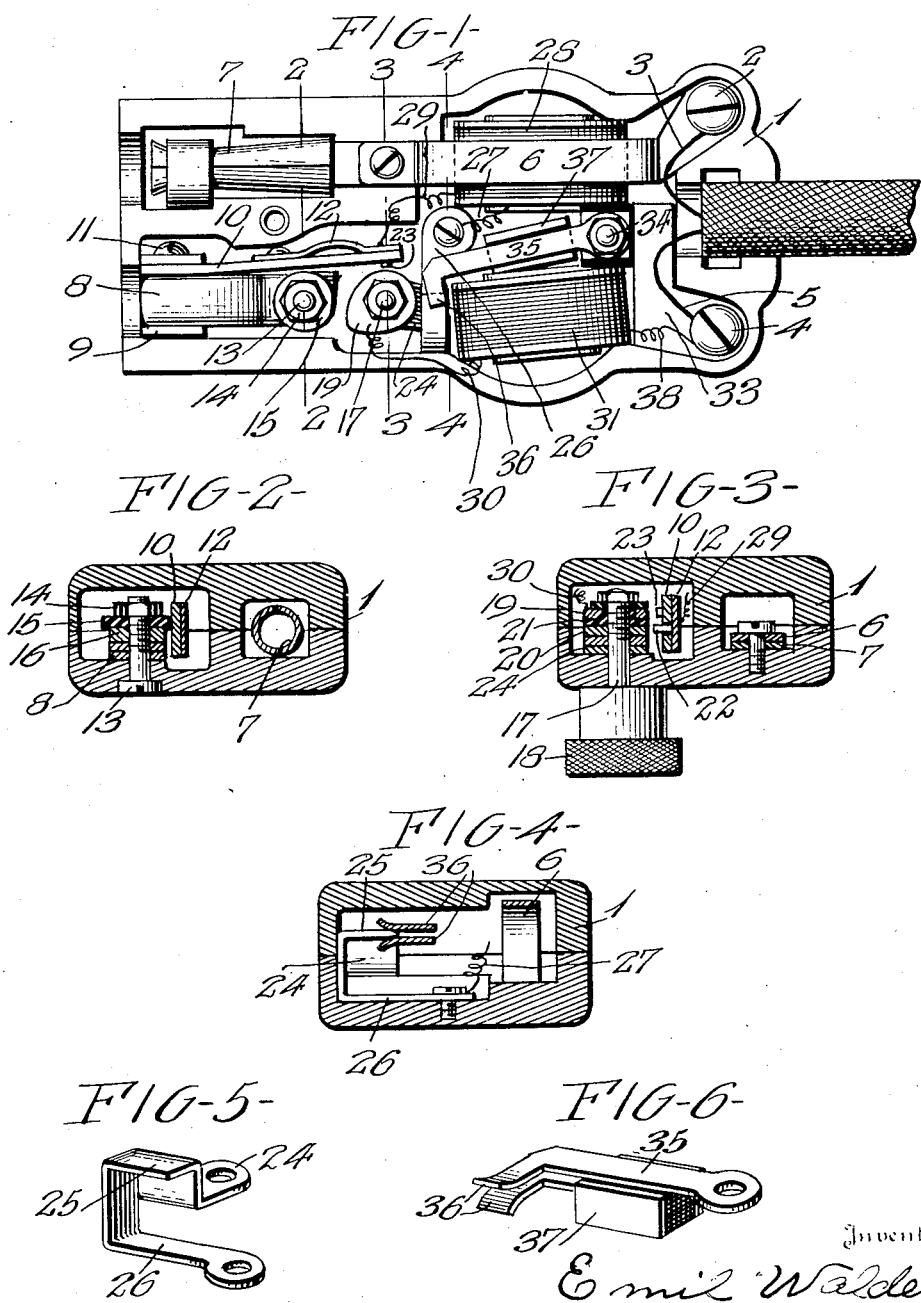

1,857,417

UNITED STATES PATENT OFFICE

EMIL WALDER, OF PHILADELPHIA, PENNSYLVANIA, ASSIGNOR TO THE BEARDSLEY & WOLCOTT MFG. CO., A CORPORATION OF CONNECTICUT

THERMOSTATICALLY CONTROLLED ELECTRIC CIRCUIT

Application filed October 27, 1926. Serial No. 144,435.

The object of my invention is to provide an improved thermostatically controlled electric circuit which can be used with either alternating or direct current.

The circuit is adapted to be used in conjunction with many different types of devices and in order to illustrate one practical manner in which this circuit can be employed, I have illustrated it in conjunction with an automatic switch plug having the conventional sockets to receive the pin connectors which are connected with the electrical appliance.

With the above and other objects in view as will hereinafter more clearly appear, my invention comprehends an improved thermostatically controlled electric circuit which is adapted to be used with either alternating or direct current.

It further comprehends an improved electric circuit having a pair of electro-magnets, a switch co-operating therewith, and a pair of contact devices controlled by said thermostat, so that the switch is controlled by one of said contact devices to energize one of said electro-magnets to effect the opening of the circuit and the switch is controlled by the other of said contact devices to energize the other of said electromagnets to effect the closing of the electric circuit.

It further comprehends an improved thermostatically controlled electric circuit wherein the current is shunted from the electromagnets to a switch when the circuit is closed.

It further comprehends an improved electrical circuit having a plurality of contact devices, one of which acts in advance of the other, and wherein each contact device is effective to control its respective electro-magnet, and the time at which the circuit is opened and closed is manually adjusted by means of manually controlled eccentrics.

It further comprehends an improved electric circuit wherein a thermostat is provided having a movable and a fixed contact which are effective to shunt the current through electromagnets to actuate a switch which controls the opening and closing of the main or working circuit.

Other novel features of construction and advantage will hereinafter more clearly appear in the detailed description and the appended claims.

For the purpose of illustrating the invention, I have shown in the accompanying drawings a typical embodiment of it, which, in practice, will give reliable and satisfactory results. It is, however, to be understood that this embodiment is typical only and that the various instrumentalities of which my invention consists can be variously arranged and organized, and the invention is not, therefore, limited to the precise arrangement and organization of these instrumentalities as herein set forth.

In these dawings:

Figure 1 is a top plan view of an automatic switch plug embodying my invention, one of the casing sections having been removed for the sake of clearness of illustration.

Figure 2 is a section on line 2—2 of Figure 1.

Figure 3 is a section on line 3—3 of Figure 1.

Figure 4 is a section on line 4—4 of Figure 1.

Figure 5 is a perspective view of a portion of Figure 1.

Figure 6 is a perspective view of a switch member in detached position.

Figures 7, 8, 9, and 10 are wiring diagrams, showing, in logical sequence, the operation of the circuit.

Similar numerals of reference indicate corresponding parts.

Referring to the drawings:—

1 designates the sectional insulating body portion of a switch plug, in conjunction with which this embodiment of my invention is employed and within which are mounted a terminal 2, connected with one of the conductors 3, and a terminal 4, connected with the other conductor 5. The terminal 2 is in electric connection by means of an offset conducting strip 6 with a socket 7 of any desired or conventional type. The other socket 8 is mounted within the body portion 1, and its fixed portion is connected to a U shaped conducting plate 9, to which is connected one end of a thermostat blade 10 by means of a fastening device 11. A spring 12, has one end fixed to the thermostat blade 10 and is disposed along the side of it. The socket 8 has electrically connected with it a terminal post 13, which carries a nut 14, which retains in position a washer 15 of insulating material. The binding post 13 has a nut 16 disposed beneath the washer 15.

A shaft 17 is rotatably mounted in the body portion 2, and is provided exterior of such body portion with a grasping handle 18, of any desired contour and of insulating material.

This shaft 17 has fixed to it, but insulated from it, an upper eccentric 19. A lower eccentric 20 is fixed to the shaft 17 and is insulated from the upper eccentric 19 by means of insulation 21. The lower eccentric 20 is adapted to co-operate with a contact 22, which is fixed to the spring 12, and which passes through an aperture in the thermostat blade 10.

The upper eccentric 19 co-operates with a contact 23, fixed to the thermostat blade 10. It will be noted that the lower contact 22 is longer than the upper contact 23. The upper eccentric 19 is in electrical connection by a wire 30 with an electro-magnet 31. The shaft 17 has electrically connected with it a conducting member 24 connected with a stationary contact 25, which extends upwardly from a conductor 26, while the latter is connected by means of a conductor 27 with an electro-magnet 28, one winding of which is connected by a conductor 29 with the spring 12.

The binding post 4 is connected by a conductor 33 with a post 34, on which is pivoted one end of a movable switch member 35 having at its lower end a separated switch contact portion 36, which co-operates with the stationary switch contact 25 to form a wiping contact therewith.

The binding post 4 is connected by a line 38 with the electro-magnet 31.

It will be seen that the automatic switch mechanism is located in the line between the terminal 4 and the socket 8, while a direct lead runs from the terminal 2 to the socket 7, and the electro-magnets are insulated from the juxtaposed parts of the mechanism in any desired manner.

The manner in which the electric circuit is operated and controlled will now be apparent to those skilled in this art and is as follows:—

The description of the operation will be best understood by reference to the wiring diagrams seen in Figures 7, 8, 9 and 10.

In Figure 7, the switch 35 is shown in its open position, so that no current is passing to the electrical appliance 39, which, for purpose of illustration, has been shown as a resistance.

Assuming now that the thermostat blade 10 assumes a position in which the lower contact 22 is in contact with the lower eccentric 20 and the upper contact 23 is in contact with the upper eccentric 19, the circuit is closed, so that the current now flows from the binding post 4 through the conductor 38 to the electro-magnet 31, thence to the upper eccentric 19, upper contact 23, through the thermostat blade 10, through the resistance 39 and back to the binding post 2.

This causes the magnet 31 to be energized, thereby moving the switch 35 from the position seen in Figure 7 into that seen in Figure 8.

The parts are now in position seen in Figure 8, in which case both of the contacts 23 and 22 are in contact with their respective eccentrics.

The current now passes to the binding post 4, to the conducting plate 33, switch 35, conducting member 24, to the lower eccentric 20, thence through the lower contact 22 to the thermostat blade 10, and through the resistance 39 to the other binding post 2, so that the circuit is closed through the resistance or electrical appliance 39.

It will be noted that the circuit is also closed through the electro-magnet 31, the upper eccentric 19 and the upper contact 23, but due to there being less resistance in the main or working circuit, the electro-magnet is not, at this time, energized.

Assuming now that the thermostat blade 10, due to its temperature, has moved into the position seen in Figure 9, in which both contacts 22 and 23 are moved away from their respective eccentrics 20 and 19, respectively, the current is now shunted through the electro-magnet 28 to the thermostat blade 10, and thence through the resistance 39 to the binding post 2.

This causes the electro-magnet 28 to be energized, thereby moving the switch 35 into the position seen in Figure 10, so that the main or working circuit is opened.

As soon as the switch 35 leaves the stationary contacts 25, the circuit is broken through the electro-magnets 28, thus de-energizing said electro-magnets.

The eccentrics 19 and 20 are manually adjustable, so that the length of travel of the contacts may be varied and thereby fix the degree of temperature which is automatically maintained in the resistance 39.

As the thermostat blade 10 cools, it will move from the position seen in Figure 10 to that seen in Figure 7, and the cycle of operation hereinbefore described is repeated.

Having thus described my invention what I claim as new and desire to secure by Letters Patent, is:—

1. An electric circuit having electro-magnets, a thermostat, a plurality of contact devices controlled by said thermostat, and a switch controlled by one of said contact devices to energize one of said electro-magnets to open the circuit and controlled by the other of said contact devices to energize the other of said electro-magnets to close the circuit through said contact devices.

2. An electric circuit having electro-magnets, a thermostat, a plurality of contact devices controlled by said thermostat, a switch controlled by one of said contact devices to energize one of said electro-magnets to open the circuit and controlled by the other of said contact devices to energize the other of said electro-magnets to close the circuit, and connections for shunting the current from said electro-magnets through the switch, said thermostat, and said contact devices when the electric circuit is closed.

3. An electric circuit having electro-magnets, a thermostat, contact devices controlled by said thermostat, a switch controlled by one of said contact devices to energize one of said electro-magnets to open the circuit and controlled by the other of said contact devices to energize the other of said electro-magnets to close the circuit, and connections for shunting the current from said electro-magnets through the switch when the electric circuit is closed, closing the circuit of both contacting devices when one electro-magnet is energized, and opening the same when the other electro-magnet is energized.

4. An electric circuit comprising a main circuit and a pair of shunt circuits, each having electro-magnets to control a switch and to thereby control said main circuit, said main circuit including a thermostat carrying a fixed and a movable contact, and eccentric means co-operating with said contacts and forming a part of said main circuit and also of said shunt circuits.

5. An electric circuit comprising a main circuit and a pair of shunt circuits, each having electro-magnets to control a switch and to thereby control said main circuit, said main circuit including a thermostat carrying a fixed and a movable contact, an eccentric co-operating with one of said contacts and forming a part of said main circuit and also of one of said shunt circuits, and a second eccentric co-operating with the other of said contacts and forming a part of the other shunt circuit.

6. An electric circuit, comprising a main circuit and two shunt circuits, the leads from the main circuit being adapted to receive the prongs of an electric appliance, said circuits including a thermostat having a contact fixed to it and a contact movably carried by it, one of said contacts controlling one shunt circuit and the other contact controlling the other shunt circuit, and said main circuit when closed including both of said contacts.

7. A thermostatic plug comprising a plug casing, a pilot terminal therein, a thermostat member connected to said terminal and carrying a contact, a contact carrying spring movable by said member, and cooperating contacts carried in said casing.

8. A thermostatic plug comprising a plug casing, a pilot terminal therein, a thermostat member connected to said terminal and carrying a contact, a contact carrying spring movable by said member, and a cooperating control mechanism including adjustable cam members carried in said casing.

9. A thermostatic plug comprising a plug casing, a pilot terminal therein, a thermostat member connected to said terminal and carrying a contact, a contact carrying spring movable by said member, cooperating control mechanism including adjustable cam members carried in said casing, and a single external adjusting member for said cam members.

10. A thermostatic plug comprising a plug casing, a pilot terminal therein, a thermostat member connected to said terminal and carrying a contact, a contact carrying spring movable by said member, and cooperating contact mechanism including adjustable cam contacts in said casing.

11. A thermostatic plug comprising a plug casing, a plurality of terminals therein, and means in said casing for connecting said terminals to the line including a plurality of shunt circuits, circuit controlling means controlled by said circuits, and thermostatically controlled means controlling the energizing of said shunt circuits.

12. A thermostatic plug comprising a plug casing, a plurality of terminals therein, one connectable directly to the line, and means in said casing connecting the other to the line including a plurality of shunt circuits each including a circuit controlling coil, circuit controlling means controlled thereby, and thermostatically controlled means controlling the current supply to said coils.

13. A thermostatically controlled control mechanism comprising a main circuit and a plurality of circuit controlling shunt circuits, and thermostatically controlled means for closing the main circuit while one shunt circuit remains closed and opening the main circuit while said other shunt circuit is closed.

14. A thermostatically controlled control mechanism comprising a main circuit and a plurality of circuit controlling shunt circuits, and thermostatically controlled circuit breaking means for breaking the main circuit and one of said shunt circuits while energizing the other shunt circuit to interrupt current flow therethrough.

15. A thermostatically controlled controlling mechanism comprising a main circuit including a movable contact and thermostatically controlled contact means, and a plurality of shunt circuits successively controlling said movable contact and controlled by said thermostatically controlled means.

16. A thermostatically controlled controlling mechanism comprising a main circuit including a movable contact and thermostatically controlled contact means, and a plurality of shunt circuits controlling said movable contact and successively rendered operative by said thermostatically controlled means to actuate said movable contact.

17. A thermostatically controlled control mechanism comprising a main circuit including a movable contact and thermostatically controlled contact mechanism, and a plurality of shunt circuits of greater resistance than the main circuit and each including a coil actuating said movable contact and controlled by said thermostatically controlled mechanism.

18. A thermostatically controlled control mechanism comprising a main circuit and a plurality of circuit controlling shunt circuits, a movable contact in the main circuit, opposed actuating means therefor respectively connected in different shunt circuits, and thermostatic controlling means for said shunt circuits disposed in the main circuit.

19. A thermostatically controlled electric control mechanism for electrically heated devices comprising a main circuit having a contact mechanism and a plurality of normally closed thermostatically controlled contact mechanisms therein, a shunt circuit connected to one of the latter mechanisms and controlling the first mentioned contact mechanism, and another shunt circuit controlled by said thermostatically controlled contact mechanism and likewise controlling said first mentioned contact mechanism.

20. A thermostatically controlled control mechanism for electrically heated devices comprising a main circuit including a contact mechanism and a plurality of thermostatically controlled contact mechanisms, a shunt circuit connected by one of the latter and closing the first mentioned contact mechanism while leaving said shunt circuit connected, and another shunt circuit controlled by said thermostatically controlled contact mechanism and opening said first mentioned contact mechanism while said last mentioned shunt circuit is connected.

21. A thermostatically controlled control mechanism for electrically heated devices comprising a main circuit including a contact mechanism and a plurality of thermostatically controlled contact mechanisms, a shunt circuit connected by one of the latter mechanisms and controlling the first mentioned contact mechanism, and another shunt circuit controlled by said thermostatically controlled mechanism and likewise controlling said first mentioned contact mechanism, and means for simultaneously setting said thermostatically controlled mechanisms.

22. An electric circuit comprising main and shunt circuits and thermostatically controlled controlling means therefor including a main switch and a thermostat both included in the main circuit, and connections including a plurality of contacts controlled by said thermostat whereby one of said shunt circuits controls the opening of the main circuit, and the other shunt circuit controls the closing of the main circuit.

EMIL WALDER.